United States Patent [19]

Sarugaku

[11] Patent Number: 4,883,938

[45] Date of Patent: Nov. 28, 1989

[54] METHOD AND APPARATUS FOR AUTOMATICALLY PERFORMING WORK ON AN OBJECT ALONG A DESIRED PATH

[75] Inventor: Shinichi Sarugaku, Funabashi, Japan

[73] Assignees: Hitachi Ltd., Tokyo; Hitachi Keiyo Engineering Co., Ltd., Narashino, both of Japan

[21] Appl. No.: 184,189

[22] Filed: Apr. 21, 1988

[30] Foreign Application Priority Data

Apr. 24, 1987 [JP] Japan .................................. 62-100130

[51] Int. Cl.⁴ .............................................. B23K 9/12
[52] U.S. Cl. .............................. 219/124.34; 219/125.1; 901/42
[58] Field of Search ............. 219/125.1, 125.11, 60 R, 219/60 A, 124.34; 901/42, 41, 46

[56] References Cited

U.S. PATENT DOCUMENTS 3,651,290 3/1972 Durbin et al. .................... 219/60 A
4,260,870 4/1981 Sekino et al. ...................... 219/60 R
4,742,207 5/1988 Nakashima et al. ............. 219/125.1

Primary Examiner—Clifford C. Shaw
Attorney, Agent, or Firm—Fay, Sharpe, Beall, Fagan, Minnich & McKee

[57] ABSTRACT

An automatic welding method and an automatic welder in which welding conditions are automatically set in compliance with the position or posture of a welding torch relative to a work piece and the welding path. The direction of gravity is added as one of parameters necessary for automatic setting of the welding conditions and the welding condtions are controlled to comply with changes in the welding torch position relative to the gravitational direction and the welding path, thereby ensuring that the automatic welder can be realized which can be installed to face to any directions and that work pieces having various profiled and welding paths can be welded automatically with high quality.

29 Claims, 8 Drawing Sheets

| THICK-NESS | CURRENT | VOLTAGE | WELDING SPEED | REQUIRED LEG LENGTH |
|---|---|---|---|---|
| 1.6 | 100.0 | 18.0 | 37.9 | 3.0 |
| 2.3 | 107.5 | 18.3 | 43.6 | 3.0 |
| 3.2 | 115.0 | 18.7 | 27.7 | 4.0 |
| 4.5 | 157.5 | 21.1 | 29.4 | 5.0 |
| 6.0 | 210.0 | 25.0 | 30.3 | 6.0 |
| 8.0 | 270.0 | 30.0 | 23.5 | 8.0 |
| 2.3 | 100.0 | 18.0 | 37.9 | 3.0 |
| 2.3 | 150.0 | 21.2 | 75.9 | 3.0 |
| 2.3 | 200.0 | 24.0 | 113.9 | 3.0 |
| 2.3 | 250.0 | 28.2 | 151.9 | 3.0 |
| 2.3 | 300.0 | 33.0 | 189.9 | 3.0 |
| 3.2 | 100.0 | 18.0 | 21.3 | 4.0 |
| 3.2 | 150.0 | 21.2 | 42.7 | 4.0 |
| 3.2 | 200.0 | 24.0 | 64.1 | 4.0 |
| 3.2 | 250.0 | 28.2 | 85.4 | 4.0 |
| 3.2 | 300.0 | 33.0 | 106.8 | 4.0 |
| 2.3 | 89.4 | 18.0 | 30.0 | 3.0 |
| 2.3 | 128.9 | 19.4 | 60.0 | 3.0 |
| 2.3 | 168.4 | 22.7 | 90.0 | 3.0 |
| 2.3 | 207.9 | 24.7 | 120.0 | 3.0 |
| 2.3 | 247.4 | 28.0 | 150.0 | 3.0 |
| 2.3 | 286.9 | 31.6 | 180.0 | 3.0 |
| 3.2 | 120.2 | 19.0 | 30.0 | 4.0 |
| 3.2 | 190.4 | 23.5 | 60.0 | 4.0 |
| 3.2 | 260.4 | 29.0 | 90.0 | 4.0 |
| 3.2 | 330.8 | 36.0 | 120.0 | 4.0 |

METHOD AND APPARATUS FOR AUTOMATICALLY PERFORMING WORK ON AN OBJECT ALONG A DESIRED PATH

BACKGROUND OF THE INVENTION

This invention relates to an automatic working method and an automatic working machine and more particularly to an automatic arc welding method and machine which are suitable for a welding robot.

In recent years, the shape and the welding path of a work piece (an object to be welded) have been practiced in great variety and the advent of an automatic welder having capability to meet such a variety of needs has been desired.

A prior art welder designed to comply with such various needs is disclosed in, for example, "Program for Flat Fillet Welding Parameters by $CO_2$ Arc Welding,'- 'Papers of the Japan Welding Society, Vol. 4, No. 1, 1986. This paper reports algorithm for automatically deriving welding conditions applicable to a narrow restricted area alone. This prior art welder can however be applied only to the specified type of welding or flat fillet welding. Further, this prior art welder is designed to take a predetermined installation direction, that is, forced to face a predetermined direction when installed. Accordingly, this prior art can not sufficiently meet the aforementioned needs.

In electric arc welding, molten metal forms a pool and the pool is cooled so as to be solidified into a bead by which base metals can be jointed together.

It is therefore clear that the condition (shape, size, temperature and the like) of the pool of molten metal appearing in this phase greatly affects the quality of welding.

More specifically, the pool is naturally a liquid pool affected by gravity and its shape varies depending on a direction of the pool surface relative to the direction of gravity or the direction in which the gravity exerts its influence. Under the circumstances, if the welding condition is improper, the molten metal will collapse to flow out, giving rise to defective welding.

The previously-described prior art fails to take the influence of gravity into consideration and has difficulties in insuring welding qualities when complying with a variety of work piece shapes and welding paths.

The above situation is seen in the field of sealing robots as well. Sealing robots are those having a nozzle fixed to an arm thereof for sealing a joint by feeding to the nozzle a sealing material bit by bit. In this field as well, there is seen a great demand for a more versatile sealing robot.

SUMMARY OF THE INVENTION

An object of this invention is to provide an automatic working method and apparatus.

Another object of this invention is to provide an automatic welding method and an automatic welder by which the welder is permitted to face to any directions when installed.

Still another object of this invention is to provide an automatic working method and an automatic welder by which work pieces having various shapes and welding paths can be welded.

Still another object of this invention is to provide an automatic working method and an automatic welder by which sufficiently satisfactory welding qualities can always be insured irrespective of the shape and the welding path of a work piece.

According to one aspect of the invention, to accomplish the above principal object, the welding condition is automatically set by always taking into consideration the direction of gravity.

More specifically, in the automatic welder, the welding direction or welding position relative to a work piece (torch posture or weld proceeding direction) is given in advance or detected by means of a sensor and in any case the welding direction or welding position can be known. Accordingly, when the direction of gravity can be given as a reference direction by detecting the gravitational direction by means of a gravitational direction sensor which is so disposed as to clarify the positional relation between the direction of gravity and the welder or by manually inputting gravitational direction data when the welder body is fixedly installed, the reference gravitational direction and the welding direction can be used to recognize the welding direction or welding position relative to the direction of gravity. Since the welding direction or welding position is not determined by being referenced to the installation direction of the automatic welder but determined by being referenced to the gravitational direction in this way, constraint imposed on the direction of installation of the automatic welder can be excluded.

Also, in accordance with the invention, the welder comprises means for detecting a joint geometry of a work piece or means for inputting joint geometry data to thereby determine the joint geometry. Various welding positions and joint geometry relative to the gravitational direction are sorted into classification groups beforehand, and a set of tables are prepared in which optimum welding conditions are enumerated in respect of individual classification groups. Some of the tables are suitably selected and used to perform automatic welding of work pieces having various shapes and welding paths.

To increase versatility of the fixed conditions enumerated in the table, welding conditions can preferably be determined by additionally applying such a regulation as "When the welding speed is to be increased, the welding current and voltage should be increased correspondingly", "In the case of upward welding, weaving inclusive of end point stops should be used" or "For downward welding, a back-step angle of about 15° should be used" and better results can be obtained. In this connection, the back-step angle is an angle defined by 90°-(torch angle with respect to welding direction).

As regards the molten metal pool, the welding condition can be set in consideration of the influence of the gravitational direction upon the formation of the pool and therefore an optimum pool can always be formed which can follow changes in the welding direction to ensure good welding qualities.

DESCRIPTION OF THE PREFERRED EMBODIMENTS

Before describing an embodiment of the invention, various examples of the relation between the gravitational direction and the welding direction will first be described with reference to FIGS. 1A to 1G. In these figures, the gravitational direction is indicated by arrow e_G.

Figure 1A:
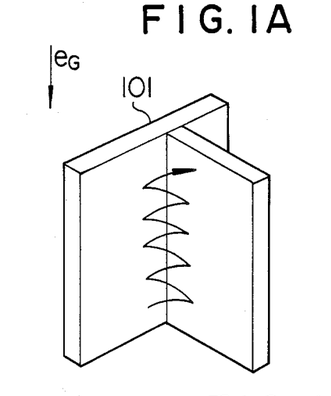
FIGS. 1A to 1G are perspective views showing various examples of welding direction.

Performed on a work piece 101 as shown in FIG. 1A is up fillet welding wherein the pool for welding has to be contrived so as not to drop. Generally, the magnitude of current used is low and the welding proceeds at a low speed through the weaving, inclusive of end point stops.

Figure 1B:
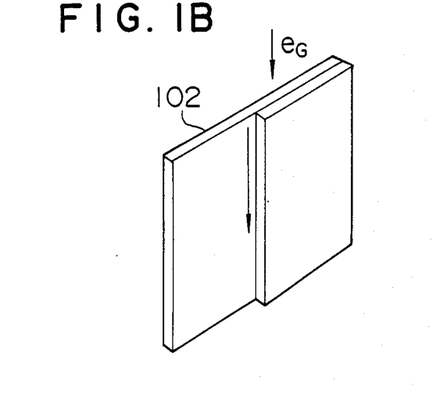

Performed on a work piece 102 as shown in FIG. 1B is down lap welding wherein the torch has a back-step angle and the welding proceeds at a relatively high speed with the flow of the pool suppressed.

Figure 1C:
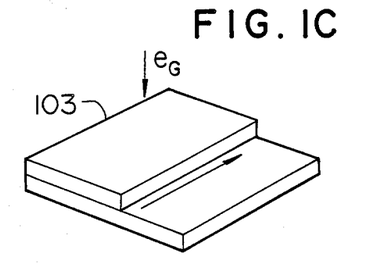
Figure 1D:
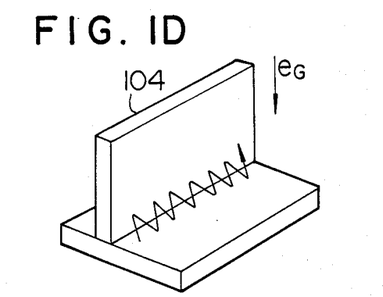

Performed on a work piece 103 as shown in FIG. 1C is horizontal lap welding. Horizontal fillet welding is performed on a work piece 104 as shown in FIG. 1D. In these examples, when the thickness of the work piece is large, weaving welding or multi-layer welding may be used.

Figures 1E, 1F, 1G:
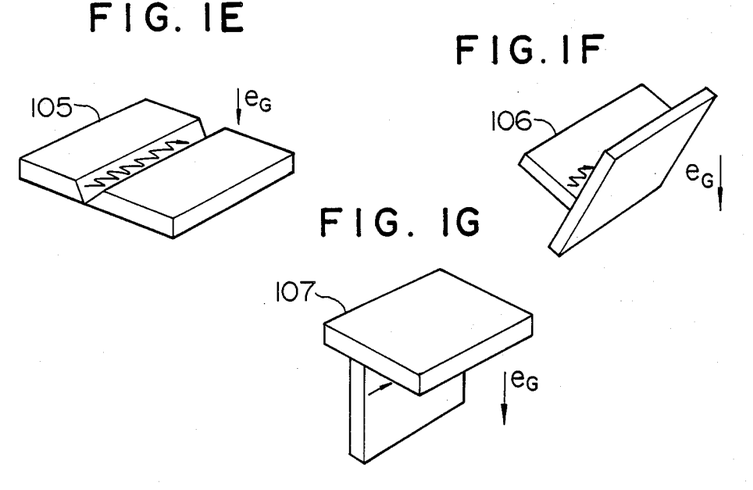

Performed on a work piece 105 as shown in FIG. 1E is downward V-groove welding. Downward fillet welding is performed on a work piece 106 as shown in FIG. 1F. Since the molten pool becomes uniform, a bead of relatively long foot length or leg length can be obtained in the form of a single layer.

Performed on a work piece 107 as shown in FIG. 1G is upward horizontal fillet welding. In this case, a large molten pool will drop by gravity. Accordingly, a small amount of current may be passed to reduce the size of the molten pool and weaving with non-uniform stop times for right and left end points may be employed.

As is clear from the above, the manner of welding is closely related to the direction of gravity. This means that the welding direction can be referenced to the reference gravitational direction so as to be recognized. Further, by also recognizing the direction of the torch in relation to the direction of gravity, any types of welding categorized as above can be selected automatically, so that tables and regulations prescribing optimum conditions for respective types of welding can be prepared and optimum welding conditions can be determined with ease.

In addition, individual welding positions are classified in accordance with, for example, the joint geometry which has relevance to the work pieces 103 and 104 shown in FIGS. 1C and 1D, and a table enumerating the corresponding welding conditions and/or regulations prescribing the corresponding welding conditions is prepared from which optimum welding conditions can be determined.

An automatic welder of the invention will now be described by way of example with reference to the accompanying drawings.

Figure 2:
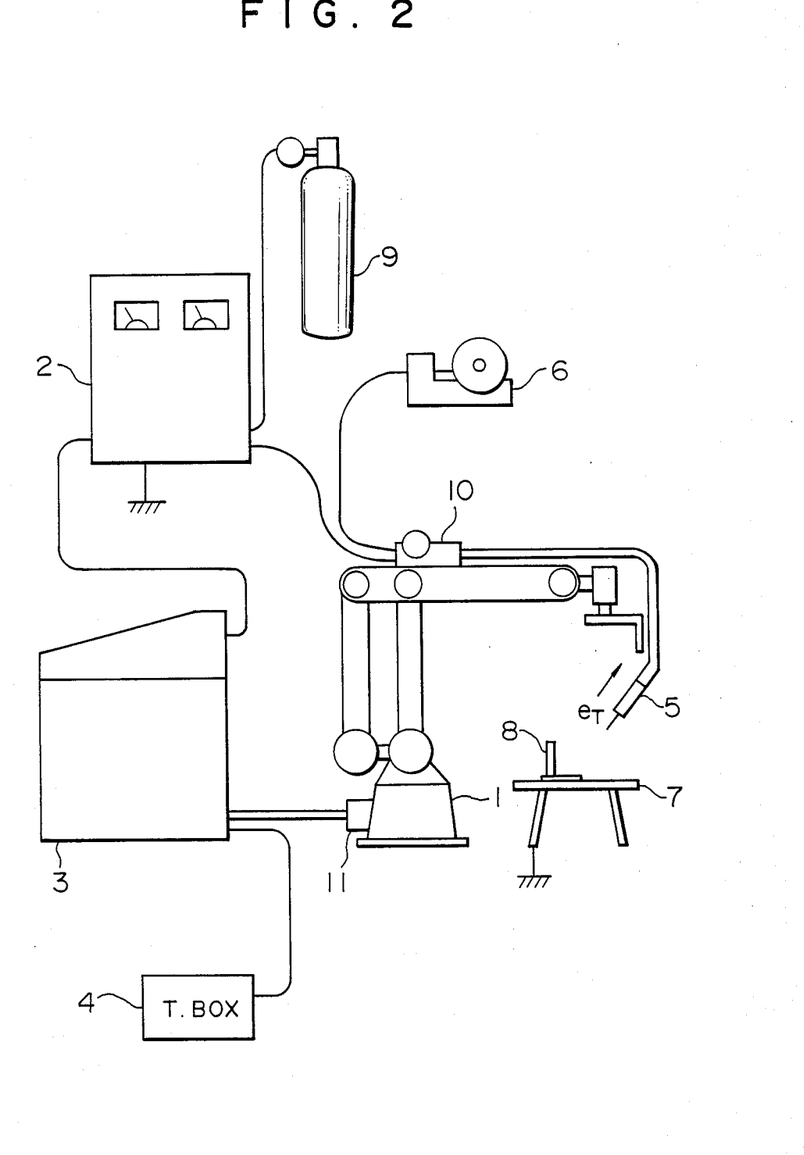
FIG. 2 is a schematic diagram illustrating a welding robot according to an embodiment of the invention.

FIG. 2 illustrates the overall construction of an automatic welder according to an embodiment of the invention. In this embodiment, the invention is realized with a six-axis robot. Referring to FIG. 2, reference numeral 1 designates a body of the six-axis robot adapted to support a welding torch 5 and move it along an instructed welding path. Six axes correspond to a rotation axis, an upper-arm axis, a front-arm axis, a bending axis, a swing axis and a turning axis. Each axis is driven by a servomotor. The robot body 1 has the hand which holds the welding torch 5. A gravitational direction detector 11 is mounted to a base of the robot body 1. The gravitational direction detector 11 comprises three acceleration pickups whose detection directions are orthogonal to each other. Without resort to the detector 11, the operator may manually input gravitational direction data.

A wire feeder 10 is adapted to feed a welding wire 6 to the torch 5.

A robot controller 3 has, on its top, a cathode ray tube (CRT) display and an operation panel.

A teaching box (T. BOX) 4 is operable to teach the robot and its top surface is provided with buttons for manual operation of the individual axes of the robot and a teaching button for causing the robot controller 3 to fetch the present point/position of the robot.

A welder 2 is responsive to signals from the robot controller 3 to generate welding voltage and current and supply a wire feed speed command to the welding wire feeder 10.

A gas tank 9 containing a welding shield gas is connected to the welder 2 and a work piece 8 is placed on a pedestal 7.

Figure 3:
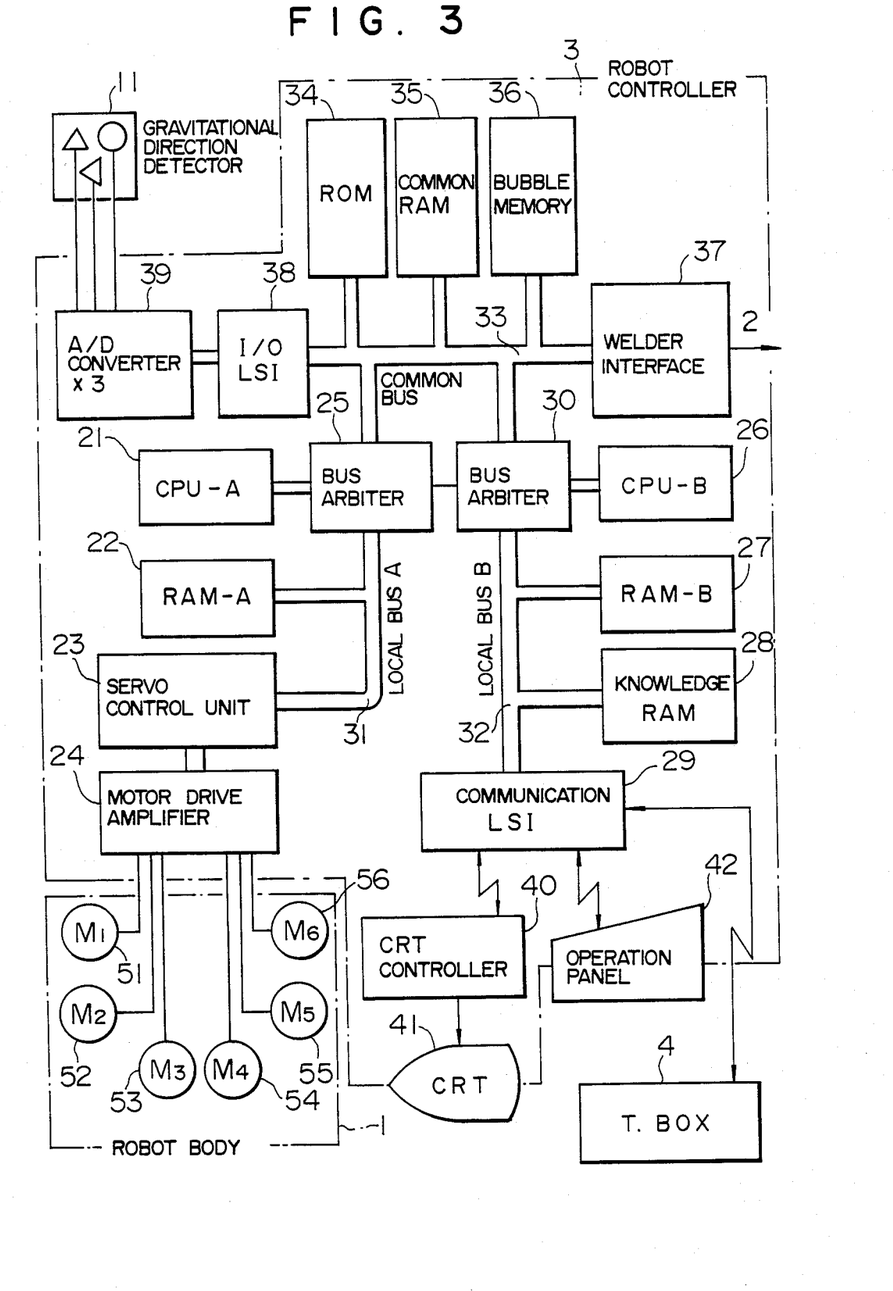
FIG. 3 is a block diagram illustrating a circuit construction of the FIG. 2 embodiment.

FIG. 3 illustrates, in block form, the internal construction of the robot controller 3. As shown, the robot controller 3 comprises two CPU's as represented by a CPU-A 21 and a CPU-B 26 which manage all the processings.

The operation of the robot is mainly controlled by the CPU-A 21 and to this end, the CPU-A 21 is coupled to a local bus A 31 and a common bus 33 through an arbiter 25.

A RAM-A 22 coupled to the local bus A stores a program describing a processing procedure for the CPU-A 21. The RAM-A 22 is also used as a work area for operations by the CPU-A 21.

A servo control 23 receives from the CPU-A 21 a destination command for the operation of the respective axes and supplies the command to a motor drive amplifier 24. In response to the command, the motor drive amplifier 24 generates current and voltage for motor driving by which motors M1 to M6 as designated by 51 to 56 are driven. The motors M1 to M6 are mounted to the robot body 1 and are associated with the rotation axis, upper-arm axis, front-arm axis, bending axis, swing axis and turning axis, respectively.

The CPU-B 26, on the other hand, is for execution of a man-machine interface and other principal units and is coupled to a local bus B 32 and the common bus 33 through an arbiter 30.

A RAM-B 27 stores a program describing a processing procedure for the CPU-B 26 and is also used as a work area for operations by the CPU-B 26.

A RAM 28 for knowledge stores optimum welding conditions for various welding states and regulations used in determining the welding conditions.

Through the medium of a communication LSI 29, the CPU-B 26 controls various units associated with the man-machine interface.

A CRT controller 40 is operative to display on the CRT display, as designated by 41, display contents received from the communication LSI 29. The operation panel as designated by 42 is provided with a keyboard, a mode change switch, a robot start/stop switch and the like switches. Signals inputted from the operation panel 42 are also sent to the CPU-B 26 through the communication LSI 29. The mode change switch effects switchover among a teach mode, welding condition setting mode and a playback mode (or execution mode) which will be described later.

The common bus 33 is accessible from both the CPU-A 21 and CPU-B 26. Simultaneous access from the two CPU's should be avoided and to this end, the arbiters 25 and 30 are employed.

A ROM 34 is described with a processing to be executed during start-up of the power supply.

A common RAM 35 is written with data used in common to the CPU-A 21 and CPU-B 26. For example, teach data information for the robot is stored in the RAM 35. Further, information exchange between CPU-A 21 and CPU-B 26 is carried out through the RAM 35.

A bubble memory 36 is adapted to store information turn off irrespective of turn-off a power supply interruption, a processing program and a knowledge of welding. In an initialization processing following turn-on of the power supply, contents of the bubble memory 36 is transferred, under the control of the CPU-A 21 and CPU-B 26, to necessary RAM's (RAM-A 22, RAM-B 27, knowledge RAM 28 and common RAM 35) and used for a control processing.

Through a welder interface 37, signal exchange is carried out between the robot controller 3 and the welder 2 shown in FIG. 2.

An I/O LSI 38 is coupled to an A/D converter 39 and responds to commands from the CPU's to control the A/D converter 39. The A/D converter 39 is comprised of three A/D converter circuits which are respectively coupled to the three acceleration pickups included in the gravitational direction detector 11. The three acceleration pickups are respectively supported in parallel to x, y and z axes of Cartesian coordinates fixed on the robot. The CPU-A 21 or CPU-B 26 is operable to detect acceleration (force) in the orthogonal three directions through the common bus 32, I/O LSI 38 and A/D converter 39 so as to determine the direction of gravity.

The operation of this embodiment will now be described.

Figure 4:
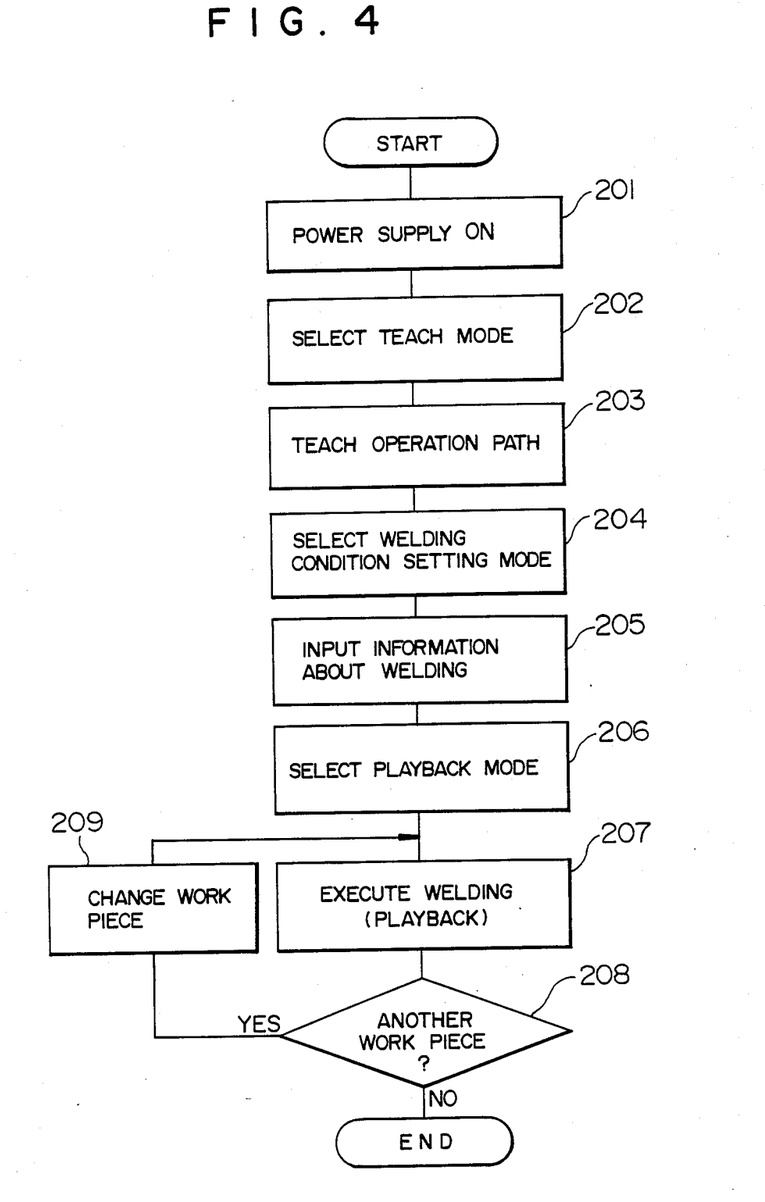
FIGS. 4 to 7 are flow charts useful in explaining the operation of the FIG. 2 embodiment.

Referring first to FIG. 4, there is illustrated a fundamental operation flow and initially the power supply is turned on in step 201. Subsequently, in step 202, the teach mode is selected by utilizing the change switch on the operation panel 42. In step 203, the robot is moved by manipulating the T. BOX 4 to teach an operation path of the robot to the robot controller 3. Concurrently with teaching of the robot operation path, start-/end of welding is also taught to the robot controller. Teach data information resulting from the teaching of the robot operation path is of a point train (position data train) in which each point is comprised of contents indicative of operation angles $\theta_1$ to $\theta_6$ of the individual axes, an operation mode (straight or arcuate path) and an operation speed (V) in and at which the robot is to be moved to the succeeding teach point and information as to whether welding is to be done.

Subsequently in step 204, the welding condition setting mode is selected. This mode is characteristic of the present invention. In step 205, information about welding is inputted. Setting of welding conditions and inputting of the information about welding will be detailed later. When the information has been inputted, optimum welding conditions are added to a point at which welding is to be done in accordance with the teach data information. Thereafter, the playback mode for performing actual welding is selected in step 206 and the robot is then started in step 207 to actually perform welding. Upon completion of the welding, it is decided in final step 208 whether there is another work piece to be welded. The "YES" output of the step 208 is connected to step 209 where the work piece is exchanged with a new one, and welding is again performed for the new work piece.

The fundamental processing procedure has been described hereinbefore but in case where the teaching has already been completed, the playback mode may be selected immediately after turn-on of the power supply to actually perform welding.

The internal processing procedure will now be described with reference to FIGS. 5 to 8. This processing procedure is executed at the CPU-B 26 while the CPU-A 21 is operated to merely actuate the robot when requested by the CPU-B 26.

Figure 5:
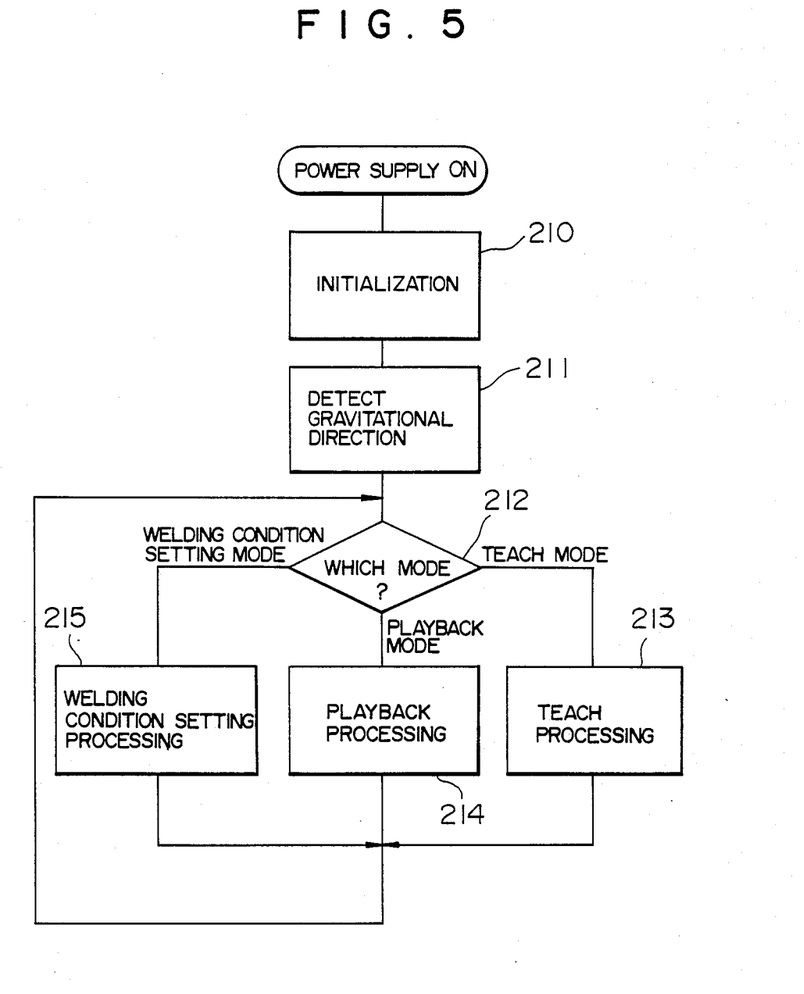

Referring to FIG. 5, there is illustrated the overall processing procedure and initialization first follows turn-on of the power supply in step 210. In this initialization step, loading of a program and data from the bubble memory 36 and various LSI's are initialized. Subsequently, in step 211, the direction of gravity is detected. This detection will be detailed later with reference to FIG. 6. In step 212, it is decided which mode is set using the operation panel 42. In the case of the teach mode, a teach processing is executed in step 213. In the teach processing, the CPU-B 26 communicates with the T. BOX 4 to receive an indication of which key on T. BOX 4 is depressed. When the depressed key is a robot operation key, the CPU-B 26 instructs the CPU-A 21 to move the robot, through the common RAM 35. When the depressed key is a teach key, the CPU-B 26 fetches the present value of the robot, prepares teach data information and stores the prepared data in the RAM 35. In the case of the playback mode, a playback processing is executed in step 214. In the playback processing, the CPU-B 26 fetches the teach data information out of the RAM 35 and transfers it to the CPU-A 21. When the start button on the operation panel 42 is depressed, the CPU-B 26 instructs the CPU-A 21 to actuate the robot. The CPU-A 21 executes movement of the robot in accordance with the teach data. Finally, in the case of the welding condition setting mode, a welding condition setting processing is executed in step 215. This processing will be detailed later with reference to FIG. 7.

Figure 6:
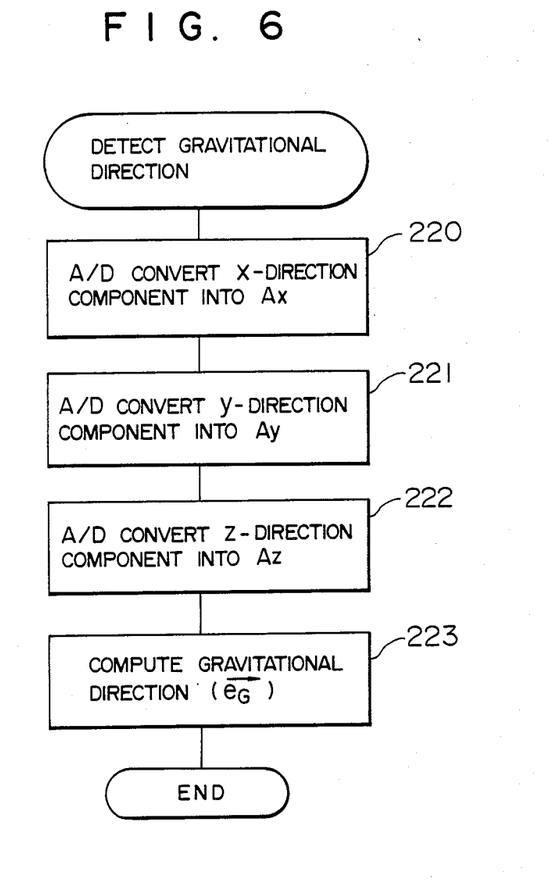

FIG. 6 is a flow chart of the processing procedure for gravitational direction detection. As described previously, the gravitational detection is carried out using the gravitational direction detector 11 mounted to the robot body 1. Also, as described previously, the gravitational direction detector 11 has the three acceleration pickups whose detection directions are orthogonal to each other. Since this detector is attached to the base of the robot, the output signal of the detector is determined in accordance with the installation condition of the robot, that is, depending on whether the robot is installed on the floor, suspended from the ceiling or hung on the wall.

Thus, the acceleration pickups detect three components of the gravity acceleration. An output voltage detected by the x-direction acceleration pickup is first A/D converted into Ax in step 220. Subsequently, a y-direction output voltage is similarly A/D converted into Ay in step 221 and finally a z-direction output voltage is A/D converted into Az in step 222. These three component values are used in step 223 to compute the gravitational direction vector, $\vec{e_G}$, pursuant to the following equation:

$$\vec{e_G} = (Ax/K, Ay/K, Az/K)$$

$$\text{where } K = \sqrt{Ax^2 + Ay^2 + Az^2}$$

The gravitational direction vector $\vec{e_G}$ indicates the direction of gravity as viewed from the Cartesian coordinates fixed on the robot. Taking the ideal condition of installation on the floor, for instance, there results $$\vec{e_G} = (0,0,-1).$$

Figure 7:
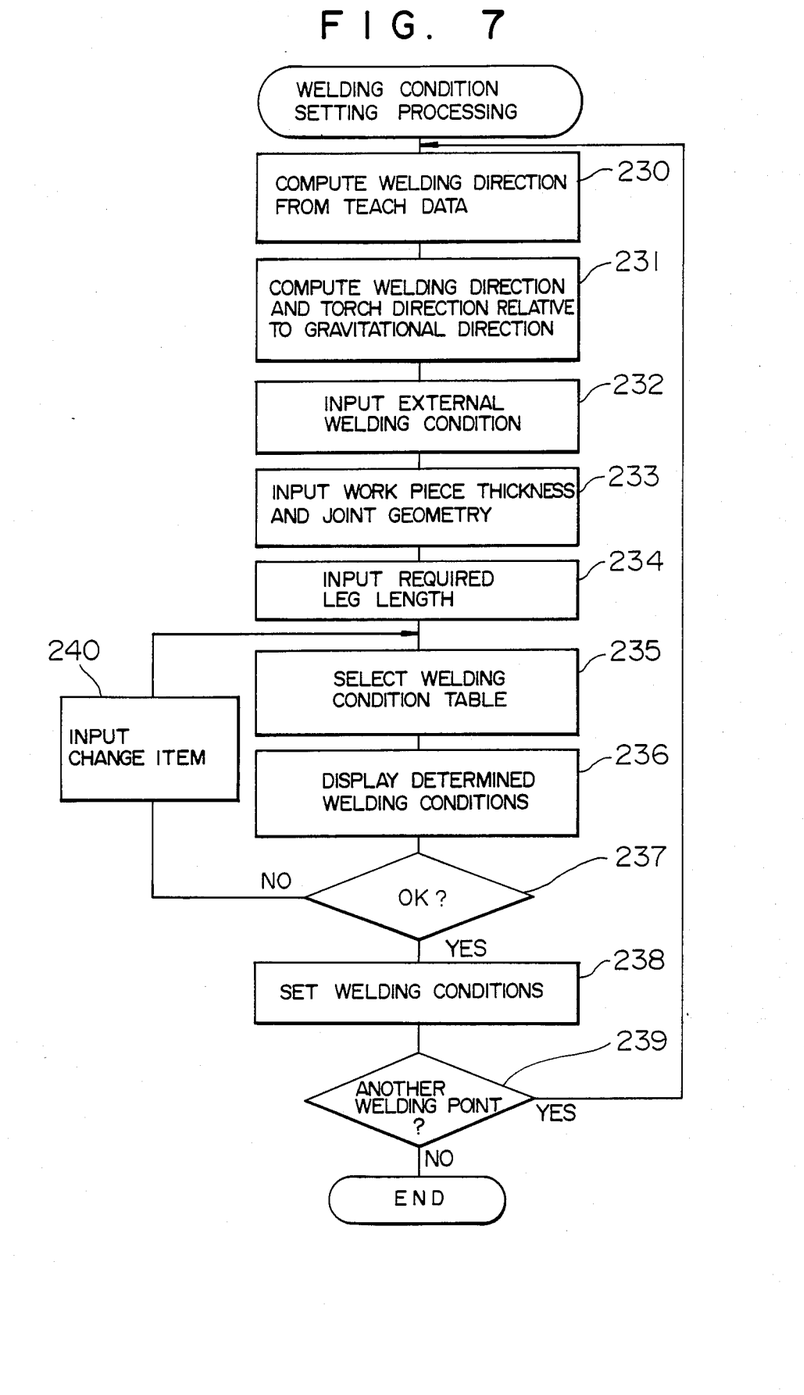

Referring now to FIG. 7, the welding condition setting processing will be described.

Firstly, in step 230, welding points are searched and the welding direction is computed. For computation of the welding direction, by using an artification angle $P_1$ of each axis at a welding start point which is $P_1=(\theta_1, \theta_2 \ldots \theta_6)$ and an articulation angle $P_2$ of each axis at a welding end point which is $P_2=(\theta_1', \theta_2' \ldots \theta_6')$, $$\vec{x_1} = \begin{pmatrix} x_1 \\ y_1 \\ z_1 \end{pmatrix} = \begin{pmatrix} f_x(P_1) \\ f_y(P_1) \\ f_z(P_1) \end{pmatrix}$$

$$\vec{x_2} = \begin{pmatrix} x_2 \\ y_2 \\ z_2 \end{pmatrix} = \begin{pmatrix} f_x(P_2) \\ f_y(P_2) \\ f_z(P_2) \end{pmatrix}$$

is first calculated to obtain orthogonal data from the articulation angles, where $f_x$, $f_y$ and $f_z$ are coordinate conversion functions and $x_1$, $y_1$ and $z_1$ are coordinate values referenced to a reference welding point. By using the computed orthogonal data, the welding direction $\vec{e_W}$ is given by $$\vec{e_W} = \begin{pmatrix} (x_2 - x_1)/K' \\ (y_2 - y_1)/K' \\ (z_2 - z_1)/K' \end{pmatrix}$$

$$\text{where } K' = \sqrt{(x_2 - x_1)^2 + (y_2 - y_1)^2 + (z_2 - z_1)^2}.$$

Subsequently, in step 231, the welding direction and torch direction relative to the gravitational direction are computed. The welding direction is first calculated from $$\theta = \cos^{-1}(\vec{e_W} \cdot \vec{e_G})$$

From values of the computed $\theta$ (angle subtended by the gravitational and welding directions) one of the following relationships:

| | |
|---|---|
| $\theta \leq 10°$ | downward welding |
| $80° \leq \theta \leq 100°$ | horizontal welding |
| $170° \leq \theta$ | upward welding | can be determined.

The torch direction is subsequently calculated from $P_1$ pursuant to $$\vec{e_T} = G(P_1)$$

where $$|\vec{e_T}| = 1,$$

wherein G is a function used for calculating the torch direction from the articulation angle $P_1$ and determined by the construction of the individual axes.

By using the $\vec{e_G}$, $\vec{e_W}$, $\vec{e_T}$ determined in the manner as described above, an aim angle $\alpha$ of torch subtended by the gravitational direction ($\vec{e_G}$) and torch direction ($\vec{e_T}$) is given by $$\alpha = \cos^{-1}\left( \frac{\vec{e_W} \times (\vec{e_T} \times \vec{e_W})}{|\vec{e_W} \times (\vec{e_T} \times \vec{e_W})|} \cdot \vec{e_G} \right)$$

on the assumption that the tip of the torch is oriented to a point of intersection of the two vectors $\vec{e_G}$ and $\vec{e_T}$.

Assuming welding in which the welding direction $\vec{e_W}$ is horizontal, the torch direction may be determined as follows:

| | |
|---|---|
| $160° \leq \alpha$ | downward |
| $100° \leq \alpha \leq 160°$ | horizontal |
| $\alpha \leq 45°$ | upward. |

The thus determined $\theta$ and $\alpha$ are stored in the RAM-B 27.

Subsequently, in step 232, external conditions for welding are inputted. Included in the external conditions are the kind of shield gas, the diameter of welding wire, the kind of welding wire and the like.

In step 233, the thickness (t) of the work piece and the type of welding for the groove or joint are inputted. The groove and joint may be welded through fillet welding, lap welding, V-groove welding, flare welding, L-groove welding and I-joint welding, and data information representative of the type of welding is inputted from the keyboard.

In step 234, a so-called foot length or leg length representative of a required length of bead is inputted.

In step 235, optimum welding conditions are determined using the thus far inputted welding direction ($\theta$), torch aim angle ($\alpha$), external welding conditions work piece thickness, joint geometry and required leg length.

Specifically, the welding position is first determined on the basis of $\alpha$ and $\theta$ as follows:

| | |
|---|---|
| $\theta \geq 135°$ | upward welding (FIG. 1A) |
| $45° \geq \theta$ | downward welding (FIG. 1B) |
| for $135° > \theta > 45°$, $\alpha$ is examined to determine | |
| $\alpha \geq 170°$ | downward (FIG. 1E) |
| $170° > \alpha \geq 110°$ | horizontal (FIGS. 1C and 1D) |
| $110° > \alpha \geq 80°$ | sideways |
| $80 > \alpha \geq 10°$ | upward and horizontal (FIG. 1G) |
| $10° > \alpha$ | upward |

By reflecting the thus determined welding position, external conditions and joint geometry, a corresponding condition table is selected from a set of precedently prepared condition tables. The condition table prescribes optimum welding conditions in respect of individual combinations of the previously-described welding position such as upward welding, downward welding, downward torch direction, horizontal torch direction and so on, external condition and joint geometry.

Figure 8:
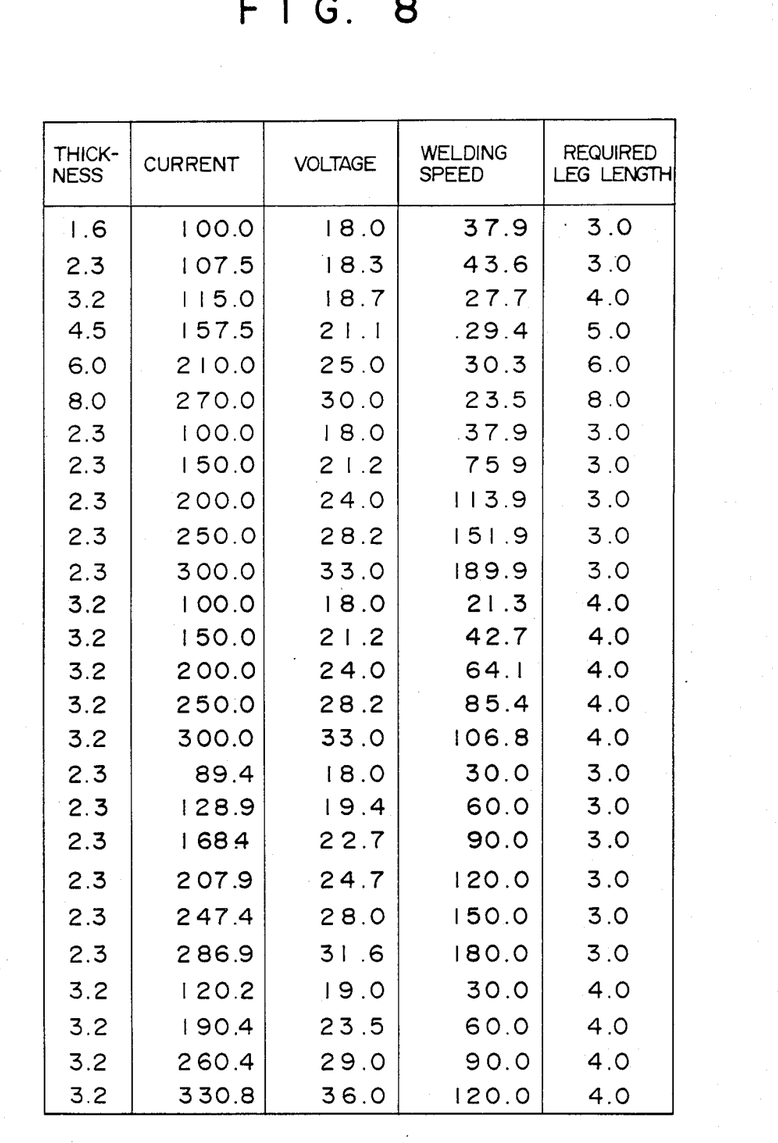
FIG. 8 shows an example of condition table used in the FIG. 2 embodiment.

FIG. 8 shows an example of the condition table. This condition table is exemplarily prepared in respect of a combination of the welding position being horizontal welding, the external condition of the shield gas being $CO_2$ and of the welding wire diameter being 1.2 mm and the joint geometry being the fillet. As shown, this table prescribes voltage and current supplied to the welding torch and the welding speed which are available for various values of the work piece thickness and required leg length.

By looking up the condition table, voltage and current are determined in accordance with a work piece thickness and the welding speed is then determined in accordance with a leg length. If a proper condition table is unavailable, table selection will be carried out using a predetermined condition. For example, given that a table enumerating thicknesses 2.0 mm and 2.6 mm is alone available for a 2.5 mm thick work piece desired to be welded, conditions for this work piece are determined by referring to a regulation newly established on the basis of proportional division of 2.0 mm and 2.6 mm in that table.

Further, regulations may be available which are relevant to the presence or absence of weaving, conditions for weaving and proper values of forward angle (angle of the torch when it is inclined within 90° to 180° with respect to the proceeding direction of the torch) and back-step angle. For example, a regulation purporting "Weaving should be used in upward welding. The weaving should be L-weaving with 0.5 sec stop at end points and 0.3 sec stop at the middle point." may be available.

Also, a regulation may be available which responds to a special request inputted by the operator. For example, when a request purporting "The welding speed should be as high as possible. Slight degradation in welding quality may be acceptable." is inputted, a regulation purporting "Concurrently with an increase in the welding speed, current and voltage should be increased" may be applied. In preparing the aforementioned table and regulations, at least one of the welding speed, voltage and current supplied to the welding torch, forward angle and back-step angle is of course determined in consideration of the influence of gravity in case where welding is affected by gravity as exemplified by weld work pieces of FIGS. 1A, 1B, 1D and 1G which have been described previously by referring to the influence of gravity in connection with the explanation of these figures. If the external conditions such as the kind of shield gas, diameter of welding wire and type thereof are preset, no external condition may be taken into consideration in selecting a condition table.

Subsequently, in step 236, the welding conditions determined in the manner described as above are displayed on the CRT display 41.

In step 237, the operator's confirmation is asked for. If a change is desired, "NO" is inputted so that a corresponding change item can be inputted in step 240. Thereafter, the procedure proceeds to determine modified welding conditions complying with the change item.

If the welding conditions are accepted, they are added to the teach data in step 238. If the welding conditions include a designated forward angle, data information about the individual axes of the robot will be modified correspondingly. Subsequently, in step 239, it is decided whether a different weld point is included in the teach data. The "YES" output of the step 239 is returned to the step 230 where the procedure for the different weld point begins. The "NO" output of the step 239 connects to "end".

As described in connection with the foregoing embodiment, optimum welding conditions can be set.

Particularly, the foregoing embodiment has the advantage that irrespective of the installation posture of the robot, the optimum welding conditions can always be set by a simplified input operation.

Even when the joint geometry is determined but the welding line (that is, the welding direction) changes with time three-dimensionally, optimum conditions can of course be selected instantly by executing the welding condition setting processing 215 shown in FIG. 5 in parallel with the execution of welding in the playback processing 214.

While in the foregoing embodiment the work piece thickness, joint geometry and the like information are inputted manually, the required manual operation may be further simplified by providing the robot with a visual sensor which permits the robot to automatically detect the above information.

Where the robot is installed on a three-dimensionally movable positioner, the gravitational direction detecting processing and welding condition setting processing can be executed in parallel with welding to always permit automatic setting of proper welding conditions.

The foregoing embodiment has been described as being applied to the robot but obviously the invention may also be applicable to a general automatic welder such as a self-running type welder.

Since the welder according to the invention can afford to always operate under the optimum welding conditions even when the welding direction changes with time during welding, the welder can sufficiently comply with a variety of shapes and welding paths of work pieces and, when applied to the robot, changes in the position or posture of the robot, so as to always maintain good weld qualities with ease.

In the above, explanation has been given to the case where the present invention is applied to an arc welding. In the following, explanation will be given to the case where the present invention is applied to a sealing operation.

Like in the case of arc welding, since the sealing material is in a liquid phase until it is solidified, it is influenced by the gravity in the course of sealing as well. A sealing robot has a similar construction as that shown in FIG. 2 wherein the torch 5 is replaced by a nozzle and the welder 2, wire 6 and gas tank 9 are replaced by a feeding unit which is controlled by the controller 3 to adjust such factors as the nozzle aperture, the pressure to be applied to the sealing material to be fed out of the nozzle and the moving speed of the nozzle. By controlling the sealing robot by means of procedures similar to those of FIGS. 4–8, appropriate sealing conditions are always obtained. In this connection, the terms "torch" and "welding" are replaced by "nozzle" and "sealing", respectively, in FIGS. 4–8.

I claim:

1. An automatic working method for use with an automatic working apparatus having an arm movable within a three dimensional space, a tool being carried by the arm, said apparatus carrying out an operation the quality of which is affected by the tool direction and the moving direction of said tool with respect to the direction of gravity, the method comprising the steps of:

storing in a memory data for setting a path along which said tool is to move and a direction of said tool;

reading said data out of said memory and calculating both a tool moving direction and a tool direction with respect to the direction of gravity on the basis of said data; and automatically controlling an operating condition for said tool on the basis of said calculated tool moving direction and tool direction.

2. An automatic working method according to claim 1, further comprising preparing predetermined sets of optimum working conditions for individual combinations of various values representative of at least a tool moving direction with respect to the gravitational acceleration direction and a tool direction with respect to the gravitational acceleration direction and a geometry of a work piece; and inputting a geometry of a work piece to be worked by the tool, said automatically controlling step including a step of selecting from said prepared sets of optimum working conditions one set of optimum working conditions on the basis of the calculated tool moving direction, the calculated tool direction and the input geometry of said work piece to be worked.

3. An automatic working method capable of automatically setting welding conditions comprising the steps of:

preparing predetermined sets of optimum welding conditions for individual combinations of various values representative of each of at least the welding direction relative to the direction of gravity, the direction of a welding torch relative to the gravitational direction and the joint geometry of a work piece to be welded;

teaching a welding path along which said welding torch is to proceed and a welding torch direction;

deriving from said taught welding path and welding torch direction the welding direction relative to the gravitational direction and the welding torch direction relative to the gravitational direction;

inputting a joint geometry of said work piece;

selecting from said prepared sets of optimum welding conditions one set of optimum welding conditions on the basis of said derived welding direction and welding torch direction relative to the gravitational direction and said inputted joint geometry; and executing welding on the basis of said selected optimum welding conditions.

4. An automatic welding method according to claim 3 further comprising the steps of:

displaying, after the selection of one set of optimum welding conditions, said selected optimum welding conditions on a display; and modifying said displayed optimum welding conditions.

5. An automatic welding method according to claim 3 wherein at least one condition included in said prepared sets of optimum welding conditions is determined in consideration of gravity.

6. An automatic welding method according to claim 5 wherein said at least one optimum welding condition prescribes at least power supplied to said welding torch and/or the welding speed in consideration of gravity.

7. An automatic welding method according to claim 3 wherein said sets of optimum welding conditions are prepared for individual combinations of additional various values representative of each of a thickness of said work piece and a required leg length, in addition to values representative of the welding direction and welding torch direction relative to the gravitational direction and the joint geometry.

8. An automatic welding method according to claim 7 wherein said inputting step further comprises inputting the thickness of said work piece and the required leg length and wherein the selection of said optimum welding condition is executed on the basis of the thickness of said work piece and the required leg length in addition to said derived welding direction and welding torch direction relative to the gravitational direction and said inputted joint geometry.

9. An automatic working apparatus having an arm carrying a tool for carrying out an operation the quality of which is affected by a tool direction and a tool moving direction with respect to the direction of gravity, comprising:

memory means for storing data representing a path along which said tool is to move and a direction of said tool;

means receiving said data from said memory means and for calculating a tool direction and a tool moving direction with respect to the direction of gravity on the basis of said data; and means for automatically controlling an operating condition for said tool on the basis of said calculated tool direction and tool moving direction.

10. An automatic welder capable of automatically setting welding conditions comprising:

a welding torch;

means for supplying electric power to said welding torch;

support/move means for supporting said welding torch in an instructed torch direction and moving said welding torch in an instructed welding direction;

means for storing data of said instructed torch direction and instructed welding direction; and means for controlling said supply means and said support/move means, said control means including means for deriving the gravitational direction, first decider means for determining a welding position of said welding torch relative to the gravitational direction on the basis of said instructed torch direction and welding direction, and second decider means for determining welding conditions on the basis of at least said welding position determined relative to the gravitational direction, wherein said welding torch and said support/move means are operated in accordance with said welding conditions.

11. An automatic welder according to claim 10 further comprising means for detecting the gravitational direction, wherein said means for deriving the gravitational direction comprises means for computing the gravitational acceleration direction on the basis of an output signal of said detecting means.

12. An automatic welder according to claim 10 further comprising means for receiving the gravitational direction manually inputted, wherein said means for deriving the gravitational direction comprises means for computing the gravitational direction on the basis of an output signal of said receiving means.

13. An automatic welder according to claim 10, wherein said welding condition determining means includes means for storing a set of predetermined tables each enumerating welding conditions for each of various predetermined welding positions, wherein one of said tables is selected from said set of tables on the basis of said determined welding position.

14. An automatic welder according to claim 13, wherein said control means comprises means for determining a joint geometry of said work piece, said set of tables are classified in accordance with various joint geometries of work pieces, and one table is selected from said set of tables on the basis of the determined joint geometry of said work piece and the determined welding position.

15. An automatic welder according to claim 14, wherein said welding conditions include values of electric power supplied to said welding torch and moving speed of said welding torch.

16. An automatic welder according to claim 15, wherein the moving speed of said welding torch is determined in consideration of the gravitational direction.

17. An automatic welder according to claim 13, wherein each table prescribes welding conditions in accordance with individual values of thickness of work pieces.

18. An automatic welder according to claim 13, wherein said welding condition determining means determines the welding conditions on the basis of a joint geometry of said work piece in addition to said determined welding position.

19. An automatic welder according to claim 18, wherein said welding condition determining means determines the welding conditions on the basis of external conditions in addition to said determined welding position and said joint geometry.

20. An automatic welder according to claim 19, wherein said external conditions include the kind of shield gas, the diameter of a welding wire and the kind thereof.

21. An automatic welder according to claim 10 wherein said control means comprises means for storing at least one preset regulation and said welding torch and said support/move means are operated in accordance said welding conditions or said regulation.

22. An automatic welder capable of automatically setting welding conditions for a work piece, comprising:
   a welding torch;
   means for supplying electric power to said welding torch;
   support/move means for supporting said welding torch in an instructed torch direction and moving said welding torch in an instructed welding direction; and
   means for controlling said supply means and said support/move means, said control means including means for deriving the gravitational direction, first means for determining a welding position of said welding torch relative to the gravitational direction on the basis of said instructed torch direction and welding direction, and second means for determining welding conditions on the basis of at least said welding position determined relative to the gravitational direction,
   said welding torch and said support/move means being operated in accordance with said welding conditions; and
   said welding condition determining means including means for storing a set of predetermined tables each enumerating welding conditions for each of various predetermined welding positions, wherein one of said tables is selected from said set of tables on the basis of said determined welding position.

23. An automatic welder according to claim 22, wherein said control means comprises means for determining a joint geometry of said work piece, said set of tables are classified in accordance with various joint geometries of work pieces, and one table is selected from said set of tables on the basis of the determined joint geometry of said work piece and the determined welding position.

24. An automatic welder according to claim 23 wherein said welding conditions include values of electric power supplied to said welding torch and moving speed of said welding torch.

25. An automatic welder according to claim 24 wherein the moving speed of said welding torch is determined in consideration of the gravitational direction.

26. An automatic welder according to claim 22 wherein each table prescribes welding conditions in accordance with individual values of thickness of work pieces.

27. An automatic welder capable of automatically setting welding conditions for welding a work piece, comprising:
   a welding torch;
   means for supplying electric power to said welding torch;
   support/move means for supporting said welding torch in an instructed torch direction and moving said welding torch in an instructed welding direction; and
   means for controlling said supply means and said support/move means, said control means including means for deriving the gravitational direction, first means for determining a welding position of said welding torch relative to the gravitational direction on the basis of said instructed torch direction and welding direction, and second means for determining welding conditions on the basis of at least said welding position determined relative to the gravitational direction,
   said welding torch and said support/move means being operated in accordance with said welding conditions; and
   said welding condition determining means determining the welding conditions on the basis of a joint geometry of said work piece in addition to said determined welding position.

28. An automatic welder according to claim 27 wherein said welding condition determining means determines the welding conditions on the basis of external conditions in addition to said determined welding position and said joint geometry.

29. An automatic welder according to claim 28 wherein said external conditions include the kind of shield gas, the diameter of a welding wire and the kind thereof.

* * * * *